Aug. 29, 1933.        J. J. McCARTHY        1,924,508
VARIABLE SPEED TRANSMISSION MECHANISM
Original Filed Oct. 31, 1930    4 Sheets-Sheet 3
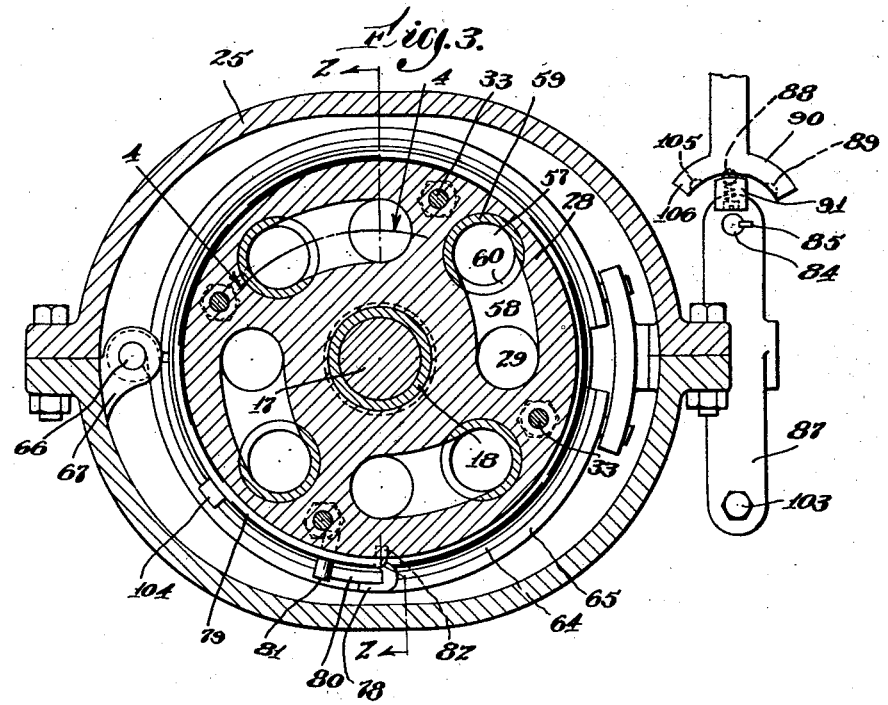
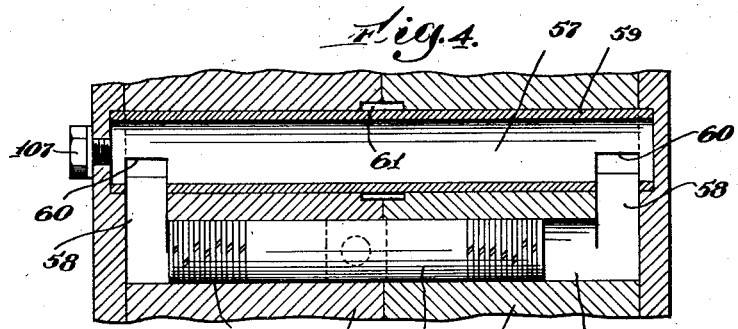
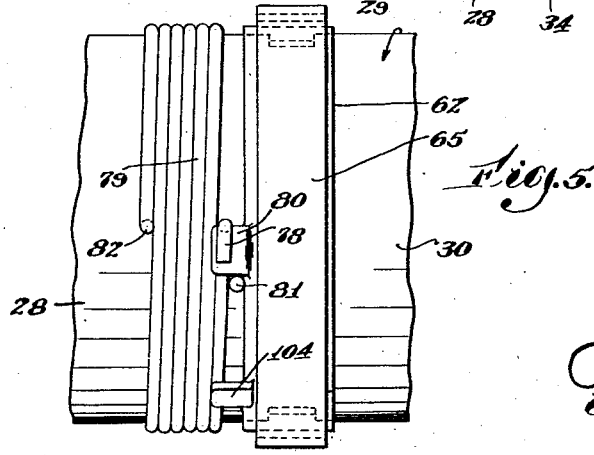
Inventor
John J. McCarthy
by James R. Hodder
Attorney Aug. 29, 1933.  J. J. McCARTHY  1,924,508
VARIABLE SPEED TRANSMISSION MECHANISM
Original Filed Oct. 31, 1930    4 Sheets-Sheet 4

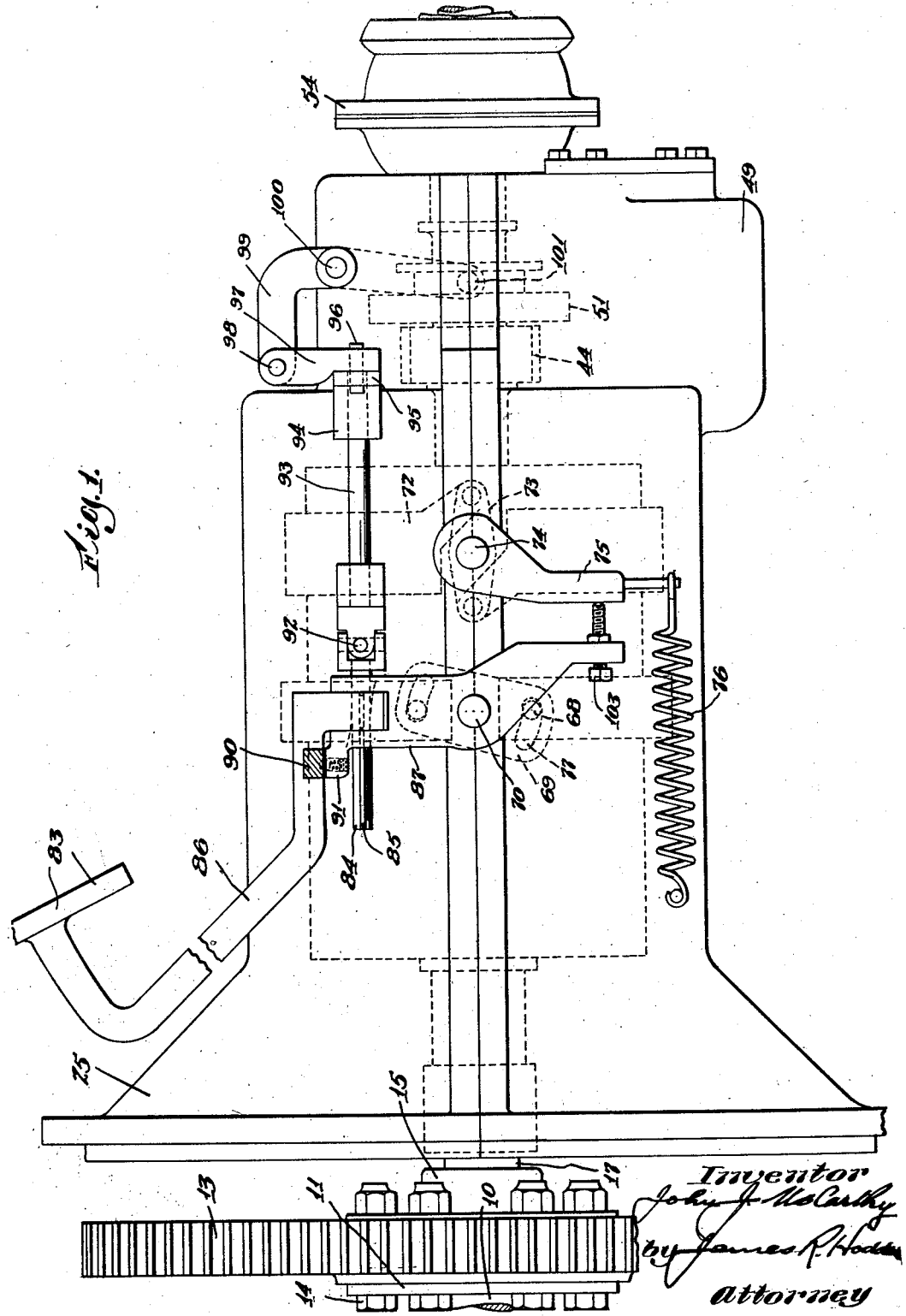

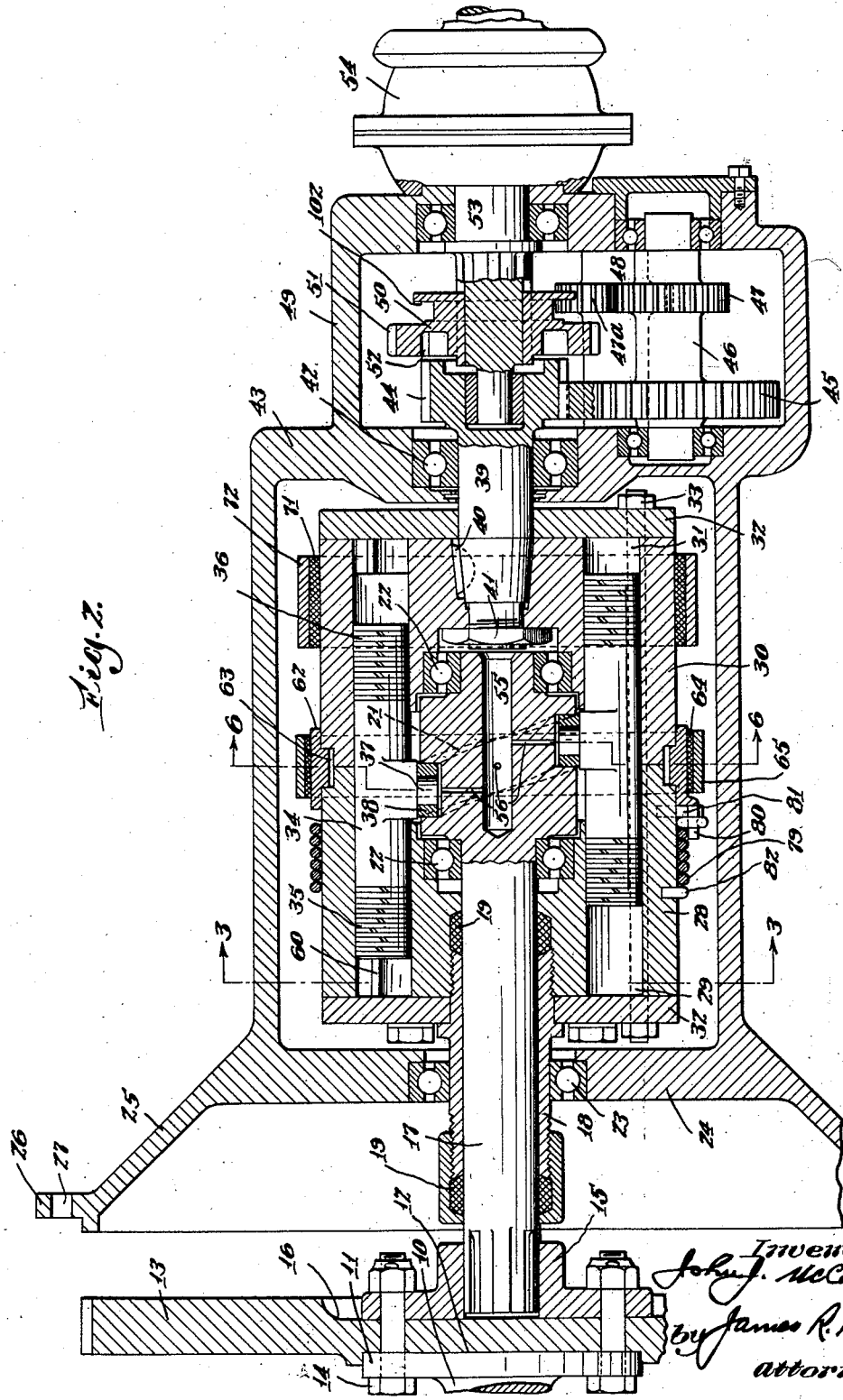

Inventor
John J. McCarthy
by James R. Hodder
Attorney

Patented Aug. 29, 1933

1,924,508

UNITED STATES PATENT OFFICE 1,924,508

VARIABLE SPEED TRANSMISSION MECHANISM

John J. McCarthy, Malden, Mass.

Application October 31, 1930, Serial No. 492,512
Renewed January 17, 1933

9 Claims. (Cl. 192—59)

The invention of the present application refers to mechanisms for transmitting power, and more particularly to a variable speed transmission mechanism.

There are many different types of speed transmitting mechanisms now in universal use, particularly in motor vehicles, such mechanisms being for the purpose of converting a practically constant engine speed into different rates of speed of a driven shaft. These mechanisms, however, are inflexible because of the fact that the number of changes of speed is strictly limited and in order to obtain the proper variations of speed of the vehicle, it is necessary to vary continuously the speed of the engine itself. The structure of such speed changing devices is such that considerable skill is necessary to obtain the necessary changes of speed without injury or damage to the speed transmission mechanism.

In my present mechanism I have designed an improved power transmission device whereby the speed transmission will be gradually put through all variations and without shock or injury.

In carrying out the invention I utilize a plurality of pistons attached to the transmission shaft, the method of attachment of said pistons being such that the pistons will have imparted thereto a reciprocation as well as a rotary movement concentrically with the axis of the transmission shaft. These pistons are double ended pistons, and associated with each piston is a plurality of alined cylinders arranged in a combined driven and driving member. Associated with each piston is a fluid reservoir for a suitable liquid, preferably oil or other heavy liquid.

Means is associated with each reservoir for determining the rate of flow of liquid from each pair of alined cylinders to the reservoir, and vice versa. The double ended piston in each pair of alined cylinders serves not only to pump the oil from one of said cylinders into its reservoir, but also to suck the oil from the reservoir into the opposite alined cylinder.

The means associated with each reservoir to determine the rate of flow of the liquid thereto and therefrom is preferably a sleeve provided with ports, one adapted to index with each cylinder in a pair.

Means is also provided to effect a rotary movement of all of the sleeves simultaneously, so that the rate of flow to and from each sleeve reservoir will be identical, means being provided to normally hold said sleeves with their ports in fully opened position.

Associated with the combined driven and driving member is a propeller or driven shaft, said driven shaft being located in axial alinement with the transmission shaft and with the driven and driving member, and means is associated with the driven shaft for driving said driven shaft at the same speed as the driven and driving member or at a different rate of speed therefrom.

I also provide means normally operative to prevent rotative movement of the driven and driving member, means being provided to gradually release this braking means as the sleeve ports are moved to position to permit rotation of said driven and driving member.

An important object of my invention, therefore, is a novel speed transmission mechanism.

Another object of the invention is the provision of a speed transmission mechanism which will be positive and efficient in its operation, and which will be simple to manufacture and assemble.

Another object of my invention is a novel and improved reverse gearing and means to operate same, coupled with my novel speed transmission mechanism.

Other features and objects of the invention reside in the particular construction and arrangement of parts of my said novel speed transmission mechanism.

The above and other objects, features, details of construction, combinations of parts, and advantages, will be hereinafter more fully pointed out, described and claimed.

Referring to the drawings illustrating a preferred embodiment of my present invention, Fig. 1 is a side elevation of my device as applied to a motor vehicle;

Fig. 2 is a longitudinal vertical sectional view on the line 2—2 of Fig. 3;

Fig. 3 is a vertical sectional view on the line 3—3 of Fig. 2;

Fig. 4 is a fragmentary cross sectional view on the line 4—4 of Fig. 3;

Fig. 5 is a fragmentary bottom plan view of the mechanism for rotating the reservoir sleeves;

Figure 6:
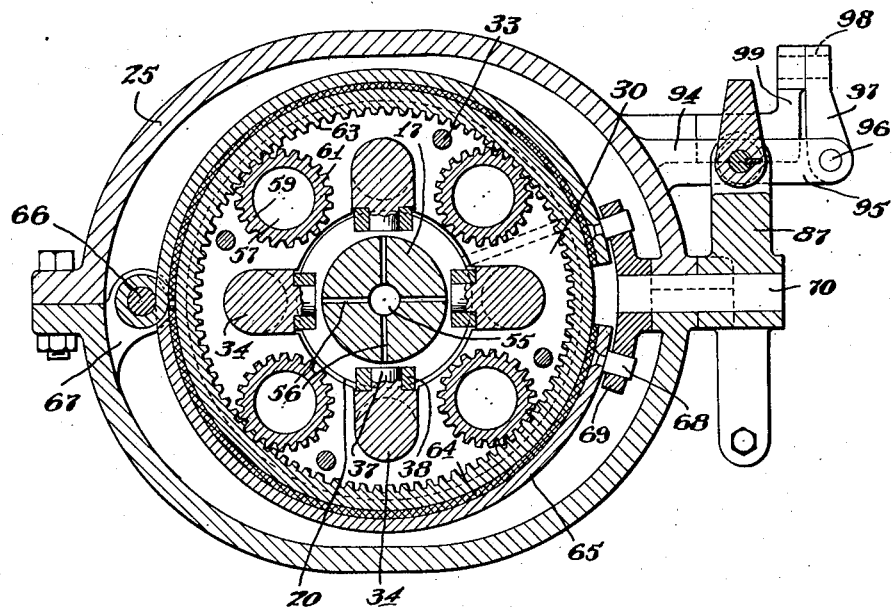
Fig. 6 is a vertical sectional view on the line 6—6 of Fig. 2.

Referring now to the drawings for a particular description of the invention, its construction and operation, 10 designates the crankshaft of a prime mover, such as an internal combustion engine (not shown), such shaft having on its rear end a flange 11 seated in a recess 12 in the usual fly wheel 13, bolts 14 being utilized to secure the fly wheel 13 to the flange 11. A member 15 is secured in the recess 16 of the fly wheel 13 by the bolts 14, and splined in the hub of the member 15, and extending rearwardly therefrom, is a transmission shaft 17, normally rotatable within a sleeve 18 provided at each end with stuffing boxes 19. Formed on the rearward end of the transmission shaft 17 is an enlarged portion 20 having a cam path 21 cut therein, and the end of said shaft 17 is mounted on ball races 22. The sleeve 18 is held in a ball race 23 mounted on the web 24 of a casing 25 which is secured to the fly wheel housing in any desired manner, a flange 26 having apertures 27 therethrough being provided for this purpose.

The inner end of the sleeve 18 is threaded into a block 28 having a plurality of cylinders 29 formed therein, and a second block 30 having a plurality of cylinders 31 therein is held in engagement with the cylinder 28 by means of the cylinder heads 32 and bolts 33. The blocks 28 and 30 are mounted in such a manner that each cylinder 29 will be alined with a corresponding cylinder 31.

A plurality of pistons 34 are provided, each having a head 35 adapted to reciprocate in a cylinder 29 and a head 36 adapted to reciprocate in a cylinder 31. Each piston is provided with a pin 37 on which is mounted a roller 38, the rollers 38 riding in the cam path 21 and being thus connected to the transmission shaft 17.

For the purpose of convenience and simplicity, I refer to the unit comprising the blocks 28 and 30 and heads 32 as a combined driven and driving member. The block 30 is keyed to a jack shaft 39 by means of a key 40, a nut 41 rigidly securing the block 30 to said shaft 39 to prevent longitudinal play. The shaft 39 is mounted in the ball race 42 in the wall 43 of the casing 25 and has formed on its rearmost end a spur gear 44, in constant mesh with a spur gear 45 on a shaft 46, a gear 47 being likewise mounted on the shaft 46 and being in constant mesh with a gear 47a on the shaft 48. These gears are all confined within a housing 49, and also mounted in the housing 49 is a gear 50 comprising an external gear 51 and an internal gear 52, this gear being mounted on the forward end of the propeller shaft 53 which is axially concentric with the shaft 39, and has a bearing therein. The propeller shaft 53 has the usual universal joint 54 thereon, the function of which is well understood.

Formed in the shaft 17 is a lubricant reservoir 55, oil leads 56 extending from said reservoir to the cam path 21 for lubrication of the rollers 38.

Associated with each cooperating pair of cylinders 29 and 31 is a fluid reservoir 57, communicating channels 58 being formed in the blocks 28 and 30. Rotatably mounted in each reservoir 57 is a sleeve 59, said sleeve 59 having a port 60 at each end thereof in alinement with the channels 58. Each of these sleeves 59 has a gear 61 formed thereon approximately midway thereof, on its exterior.

With the device as thus far described, it will be appreciated that, if rotation is imparted to the shaft 17 and cam block 20, the rollers 38, riding in the cam path 21, will effect a reciprocation of the pistons 34 in the cylinders 29 and 31, fluid being forced back and forth between the cylinders 29 and 31 through the reservoirs 57 and ports 60. Thus there will be no resistance to the pistons 34 in their travel, and the combined driven and driving member will remain stationary. Any tendency on the part of the driven and driving member to rotate will be effectually overcome by means of a brake lining 71 in a brake shoe 72, the free ends of the brake shoe 72 being united by a link 73 on a shaft 74, a lever 75 being also mounted on the shaft 74 and being held toward closed position by means of a coiled spring 76. Thus, even with the gear 52 in mesh with the gear 44, there will be no rotation imparted to the propeller shaft 53, and hence no motion of the vehicle in which the mechanism is mounted. When it is desired to impart rotation to the shaft 39, and, through the medium of the gearing in the housing 49 to the shaft 53, it becomes necessary to create a sufficient resistance to the reciprocation of the pistons 34 to convert said reciprocations into a rotative movement of the combined driven and driving member. This I accomplish by a closing of the ports 60, and a releasing of the brake 71, in the manner to be now described.

Surrounding the driven and driving member is an annulus 62 having formed thereon an internal gear 63 which is in constant mesh with the external gears 61 formed on the sleeves 59. This internal gear 63 is normally inoperative, but is partially surrounded by a pair of brake linings 64 fixed in brake shoes 65 which are pivoted at 66 on a boss 67 in the casing 25. The free end of each shoe 65 is provided with a pin 68, which pins are in turn positioned in eccentric slots 77 in a plate 69 mounted for rotation with a shaft 70.

The brake shoes 65 are normally held in inoperative position by one end 78 of a coiled spring 79, said end 78 bearing against a lug 80 on the annulus 62 and holding said lug in engagement with a pin 81, the other end 82 of the spring 79 being seated in the cylinder block 28.

It being assumed that the transmission shaft 17 is rotating, and the pistons 34 are reciprocating in their cooperating cylinders 29 and 31, and that the driven and driving member is held against rotation by means of the brake 71, and it being further assumed that the operator of the vehicle is desirous of having forward movement imparted to the vehicle, the operator will rock the pedal 83 toward the casing 25, said pedal being keyed to a shaft 84 by means of a key 85, and the pushing of the pedal 83 toward the casing rotating the shaft 84. The lower end of the lever 87, and the rocking of the pedal 83 is continued until the spring-pressed ball 88 is seated in the recess 89 formed in the arcuate arm 90 on the lower end of the arm 86. The spring-pressed ball 88 is positioned in a boss 91, preferably integral with the upper end of the lever 87. This rocking of the pedal 83 will result in a rotation of the shaft 84, and, through the medium of the universal joint 92, in a rotation of the shaft 93, which is mounted in the bearing 94 on the casing 25. Fixed to the shaft 93 and rotatable therewith is a link 95, a pin 96 uniting the link 95 and a link 97, the link 97 being in turn rotatably mounted on a pin 98 in one end of the bell crank lever 99, said lever being pivotally mounted at 100 on the housing 49. The lower end of the bell crank lever 99 is provided with pins 101 which ride in the groove 102 in the gear member 50.

It will thus be seen that rocking of the pedal 83 toward the casing 25 will effect a raising of the link 95, and hence of the link 97, rocking the bell crank lever 99 on its pivot 11 and forcing the internal gear 52 into mesh with the spur gear 44 on the shaft 39. Thereupon the operator depresses the pedal 83, the pivot point for the pedal 83 being the shaft 70. However, the lever 87 is fixed to the shaft 70, so that depression of the pedal 83 will result in a rotation of the shaft 70, and plate 69.

Prior to any closing action being imparted to the pins 68 by the slots 77, however, the set screw 103 in the lower end of the lever 87 will push the lever 75 to the right, as viewed in Fig. 1, releasing the brake 71 through the medium of the link 73. The universal joint 92 will permit sliding of the upper end of the lever 87 along the shaft 84 without effecting the shaft 93. Continued depression of the pedal 83 will tighten the brake linings 64 against the annulus 62, creating a friction thereagainst.

Now that the brake 71 has been released, the driven and driving member is free to rotate, and assuming that rotation is in the direction of the arrow in Fig. 5, such rotation will also carry the sleeves 59 with the driven and driving member. However, the gears 61 on the sleeves 59 being in mesh with the internal gear 63 on the annulus 62, and the annulus 62 being restrained by the brake linings 64, will effect a rotation of the sleeves 59 in the reservoirs 57, resulting in a closing of the ports 60 to any desired degree, the speed of rotation of the combined driven and driving member being dependent upon the resistance offered to the flow of fluid through the ports 60.

Thus, when the ports 60 are completely closed, which will be the case when the pin 81 is in engagement with the lug 104 on the annulus 62, there will be no reciprocation of the pistons 34 within their cylinders 29 and 31, but there will be a complete rotation of the entire driven and driving member and the elements carried thereby, thus constituting a direct drive from the shaft 17 to the shaft 39.

Should it be desired to reverse the direction of the motor vehicle, the operator will rock the pedal 83 away from the casing 25, in which event the spring-pressed ball 88 will be seated in the recess 105 in the arm 106. This rocking of the pedal 83 away from the casing 25 will effect a rotation of the shaft 93 in the opposite direction, with a consequent dropping of the links 95 and 97, and a lowering of the upper end of the bell crank lever 99. This will move the gear member 50 out of its forward engagement, and will bring the spur gear 51 into mesh with the gear 47a on the shaft 48, which will result in a reverse movement of the motor vehicle.

When it is desired to renew, replace, or replenish the fluid supply within the reservoirs 57, the threaded plugs 107 may be removed, permitting access to the interior of said reservoirs. The lubricant utilized is preferably a heavy fluid such as oil.

Figure 7:
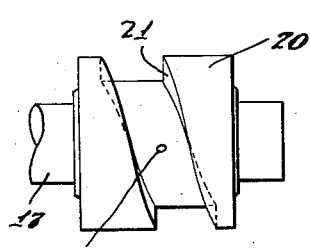
Fig. 7 is a fragmentary detail of the cam illustrated in Figs. 2 and 6.
Figure 8:
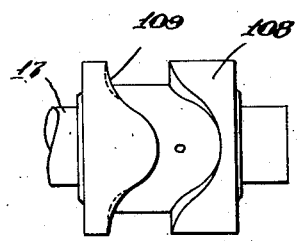
Fig. 8 is a fragmentary view of a modified form of cam.

In place of the cam block 20 and cam path 21, I may utilize, on the shaft 17, a cam block 108 having a cam path 109 therein, in which the rollers 38 are adapted to be rolled. This cam path 109 has two lobes therein, instead of a single lobe as illustrated in Fig. 7, which will result in two complete reciprocations of the pistons 34 on each revolution of the shaft 17.

Upon the release of pressure from the pedal 83, the spring 76 will return the levers 75 and 87 to normal position, releasing the pressure on the annulus 62, and again exerting pressure on the driven and driving member through the medium of the brake 71, and again preventing rotation of said driven and driving member.

I believe that the transmission mechanism illustrated and described in the present application is novel, and I have therefore claimed the same broadly herein.

While I have necessarily described my present invention somewhat in detail, it will be appreciated that I may vary the size, shape, and arrangement of parts within reasonably wide limits without departing from the spirit of the invention.

My invention is further described and defined in the form of claims as follows:

1. In a device of the kind described, the combination of a driving element, a plurality of double ended pistons connected thereto, a driven element, an intermediate driven and driving element interposed between the driving and the driven elements, a plurality of pairs of opposed cylinders in said intermediate element, one of said pistons engaging each pair of opposed cylinders, a fluid reservoir for each pair of opposed cylinders, a rotatable sleeve in each of said reservoirs, each of said sleeves having a port at each end thereof adapted to communicate with said cylinders, and means to normally maintain said ports in open position.

2. In a device of the kind described, the combination of a driving element, a plurality of doubled ended pistons connected thereto, a driven element, an intermediate driven and driving element interposed between the driving and the driven elements, a plurality of pairs of opposed cylinders in said intermediate element, one of said pistons engaging each pair of opposed cylinders, a fluid reservoir for each pair of opposed cylinders, a rotatable sleeve in each of said reservoirs, each of said sleeves having a port at each end thereof adapted to communicate with said cylinders, and spring means to normally maintain said ports in open position.

3. In a device of the kind described, the combination of a driving element, a plurality of double ended pistons connected thereto, a driven element, an intermediate driven and driving element interposed between the driving and the driven elements, a plurality of pairs of opposed cylinders in said intermediate element, one of said pistons engaging each pair of opposed cylinders, a fluid reservoir for each pair of opposed cylinders, a rotatable sleeve in each of said reservoirs, each of said sleeves having a port at each end thereof adapted to communicate with said cylinders, spring means to normally maintain said ports in open position, and means to normally prevent rotation of said intermediate driving and driven element.

4. In a device of the kind described, the combination of a driving element, a plurality of double ended pistons connected thereto, a driven element, an intermediate driven and driving element interposed between the driving and the driven elements, a plurality of pairs of opposed cylinders in said intermediate element, one of said pistons engaging each pair of opposed cylinders, a fluid reservoir for each pair of opposed cylinders, a rotatable sleeve in each of said reservoirs, each of said sleeves having a port at each end thereof adapted to communicate with said cylinders, spring means to normally maintain said ports in open position, means to normally prevent rotation of said intermediate driving and driven element, and means to release said last named means at will.

5. In a device of the kind described, the combination of a driving element, a plurality of double ended pistons connected thereto, a driven element, an intermediate driven and driving element interposed between the driving and the driven elements, a plurality of pairs of opposed cylinders in said intermediate element, one of said pistons engaging each pair of opposed cylinders, a fluid reservoir for each pair of opposed cylinders, a rotatable sleeve in each of said reservoirs, each of said sleeves having a port at each end thereof adapted to communicate with said cylinders, spring means to normally maintain said ports in open position, means to normally prevent rotation of said intermediate driving and driven element, means to release said last named means at will, and means to rotate said sleeves.

6. In a device of the kind described, the combination of a driving element, a plurality of double ended pistons connected thereto, a driven element, an intermediate driven and driving element interposed between the driving and the driven elements, a plurality of pairs of opposed cylinders in said intermediate element, one of said pistons engaging each pair of opposed cylinders, a fluid reservoir for each pair of opposed cylinders, a rotatable sleeve in each of said reservoirs, each of said sleeves having a port at each end thereof adapted to communicate with said cylinders, spring means to normally maintain said ports in open position, means to normally prevent rotation of said intermediate driving and driven element, means to release said last named means at will, means to rotate said sleeves, and means to actuate said releasing means prior to actuation of said sleeve rotating means.

7. In a device of the kind described, the combination of a driving element, a plurality of double ended pistons connected thereto, a driven element, an intermediate driven and driving element interposed between the driving and the driven elements, a plurality of pairs of opposed cylinders in said intermediate element, one of said pistons engaging each pair of opposed cylinders, a fluid reservoir for each pair of opposed cylinders, a rotatable sleeve in each of said reservoirs, each of said sleeves having a port at each end thereof adapted to communicate with said cylinders, spring means to normally maintain said ports in open position, and spring controlled means to normally prevent rotation of said intermediate driving and driven element.

8. In a device of the kind described, the combination of a driving element, including a cam block having an annular cam path formed therein, a plurality of double ended pistons symmetrically arranged around said cam block and lying parallel to each other and to the axis of the driving element, a driven element, an intermediate driven and driving element interposed between the driving and the driven elements, a plurality of pairs of opposed cylinders formed in said intermediate element and symmetrically arranged about the end faces thereof and lying parallel to each other and to the axis of the intermediate driven and driving element, said double ended pistons being positioned in said cylinders, a separate reservoir communicating with each pair of opposed cylinders and together with each pair of cylinders forming a confining space for fluids, rotary movement of said driving element causing reciprocating movement of said pistons, each of said sleeves having a port at each end thereof in communication with its respective pair of opposed cylinders, a gear on each of said sleeves, an internal gear in mesh with said sleeve gears, and means to render said internal gear operative to rotate said sleeves within their reservoirs to open or close said ports to control the flow of fluid to and from said reservoirs.

9. In a device of the kind described, the combination of a driving element, including a cam block having an annular cam path formed therein, a plurality of double ended pistons symmetrically arranged around said cam block and lying parallel to each other and to the axis of the driving element, a driven element, an intermediate driven and driving element interposed between the driving and the driven elements, a plurality of pairs of opposed cylinders formed in said intermediate element and symmetrically arranged about the end faces thereof and lying parallel to each other and to the axis of the intermediate driven and driving element, said double ended pistons being positioned in said cylinders, a separate reservoir communicating with each pair of opposed cylinders and together with each pair of cylinders forming a confining space for fluids, rotary movement of said driving element causing reciprocating movement of said pistons, each of said sleeves having a port at each end thereof in communication with its respective pair of opposed cylinders, a gear on each of said sleeves, an internal gear in mesh with said sleeve gears, and means to render said internal gear operative to rotate said sleeves within their reservoirs to open or close said ports to control the flow of fluid to and from said reservoirs, and spring controlled means to normally maintain said internal gear inoperative.

JOHN J. McCARTHY.